(No Model.) 2 Sheets—Sheet 2.
M. MOSKOWITZ.
MEANS FOR GENERATING ELECTRICITY FROM CAR WHEEL AXLES.
No. 571,951. Patented Nov. 24, 1896.
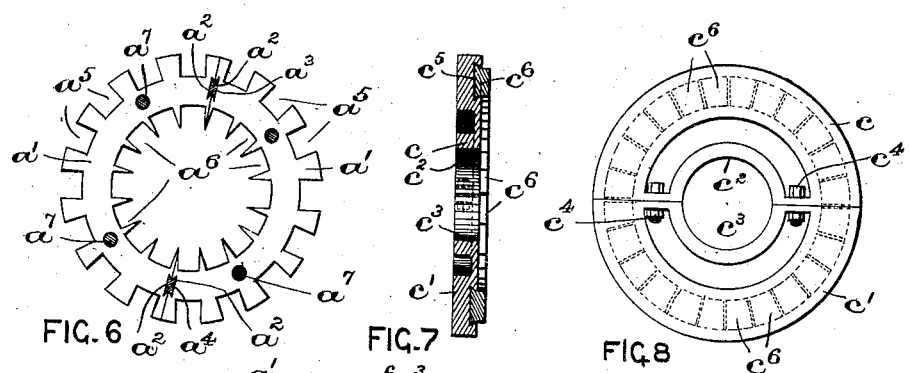
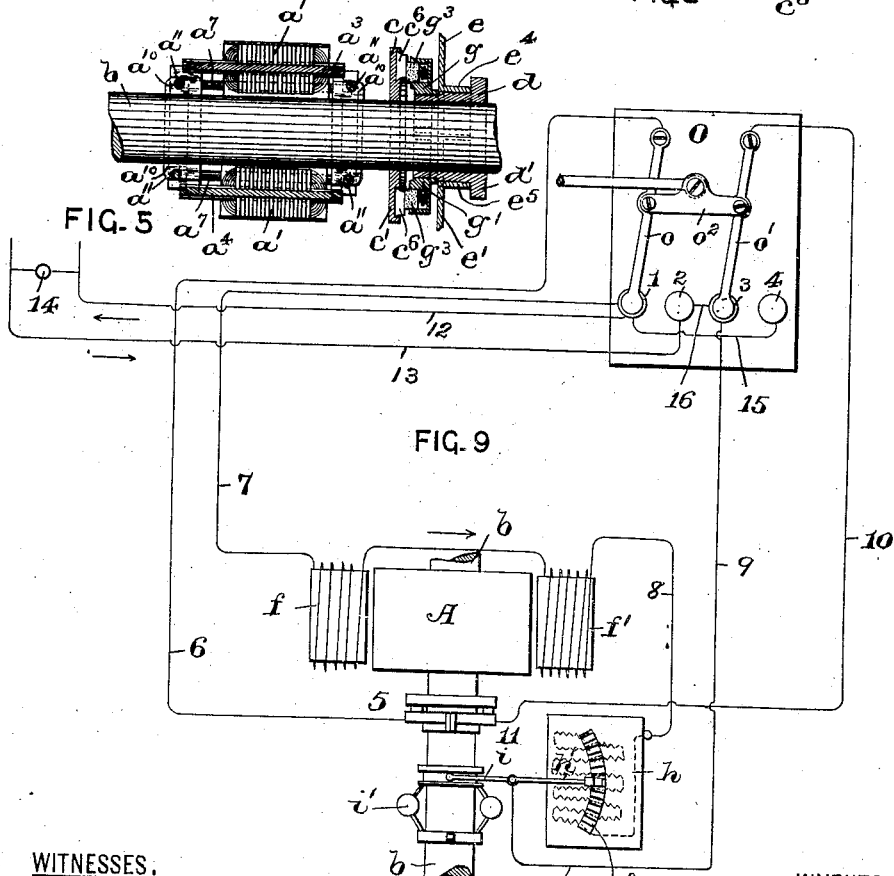
WITNESSES.
INVENTOR.
MORRIS MOSKOWITZ.
BY
ATTORNEY

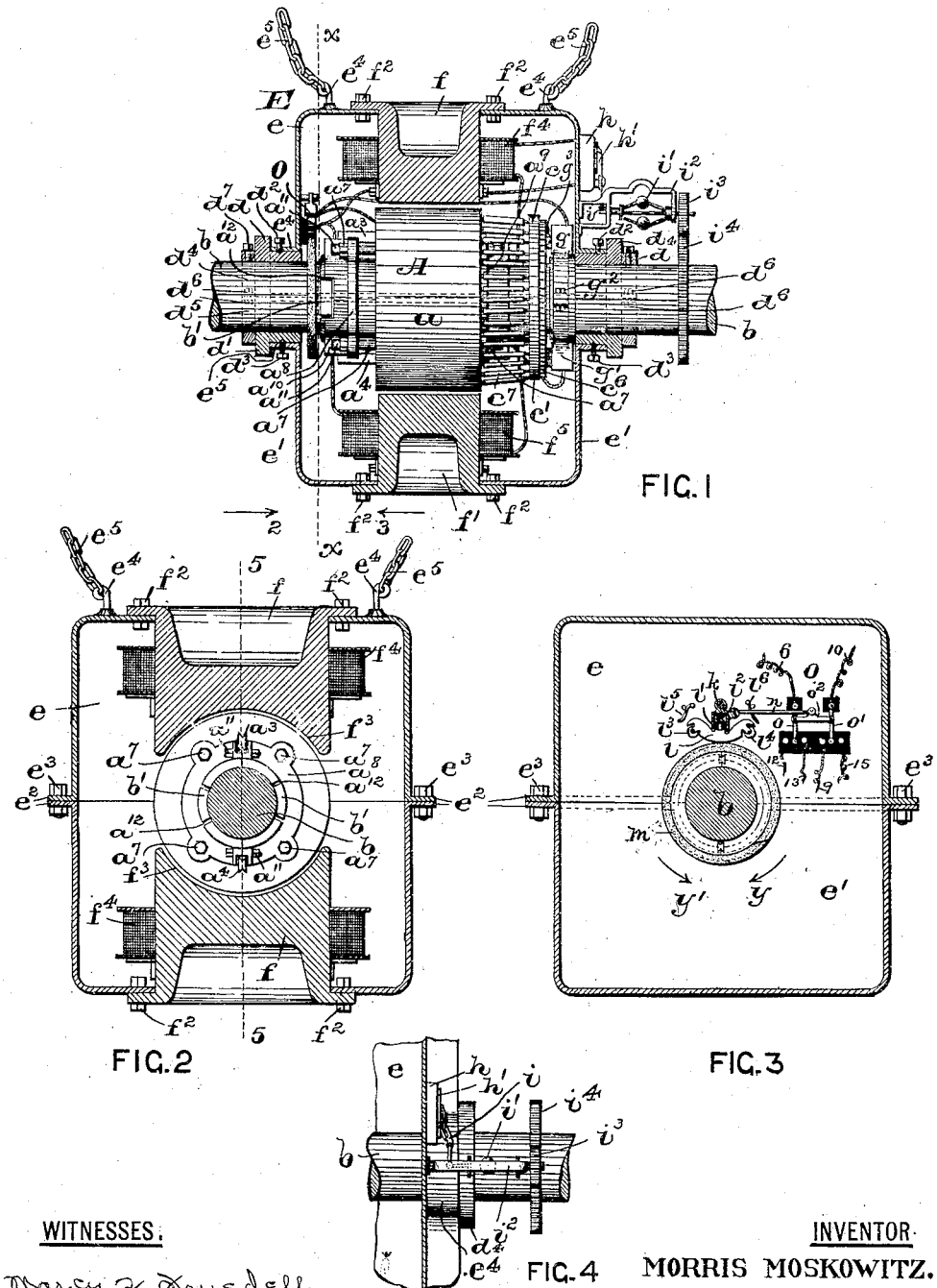

UNITED STATES PATENT OFFICE.

MORRIS MOSKOWITZ, OF NEWARK, NEW JERSEY, ASSIGNOR TO THE NATIONAL ELECTRIC CAR LIGHTING COMPANY, OF WEST VIRGINIA.

MEANS FOR GENERATING ELECTRICITY FROM CAR-WHEEL AXLES.

SPECIFICATION forming part of Letters Patent No. 571,951, dated November 24, 1896.

Application filed July 19, 1895. Serial No. 556,504. (No model.)

*To all whom it may concern:*

Be it known that I, MORRIS MOSKOWITZ, a citizen of the United States, residing at Newark, in the county of Essex and State of New Jersey, have invented certain new and useful Improvements in Means for Generating Electricity from Car-Wheel Axles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention relates to a novel means of generating electricity from a dynamo on a car-wheel axle to be used in connection with a system of lighting and heating railway-cars by electricity; and the invention is designed to provide a dynamo secured directly to the car-wheel axle, said dynamo comprising therein field-magnets, an armature, commutator, and brush-holders all made in half-sections, and means for securing these half-sections to the car-wheel axle, whereby the dynamo can be operatively arranged on the axle without removing the car-wheels, and the dynamo thereby being driven by the power derived from the said axle.

The invention is furthermore designed to provide a simple and effective contrivance or apparatus from which a constant voltage or output of electromotive force will be the result, irrespective of the speed of the dynamo-armature and the direction of the rotation of the said armature.

The invention therefore consists in the combination of a car-wheel axle and a dynamo thereon, comprising field-magnets, an armature, commutator, and brush-holders all made in half-sections, the armature-sections being separately wound before they are placed on the axle and being connected in circuit after the dynamo-sections have been secured to the axle.

The invention consists, further, in the novel arrangements and the details of construction of the dynamo to be hereinafter described, and also in the organization of several apparatus and circuits to maintain the output of the electromotive force constant, and to cause the electricity which feeds the lamps or other electric translating devices in the main circuit to pass into and through the same in one and the same direction, irrespective of the change of armature rotation due to the change of rotation of the car-wheel axle when the car moves forwardly or backwardly.

The invention is illustrated in the accompanying sheets of drawings, in which—

Figure 1 is an elevation of the dynamo mounted on a car-wheel axle in accordance with the principles of my invention, illustrating in vertical section a sectional casing and field-cores of the dynamo connected therewith and showing in side elevation one arrangement of a mechanically-operated pole-changer and a mechanical governor operated from the car-wheel axle to control a rheostat for the purpose of graduating the field strength and to maintain the potential at the terminals constant. Fig. 2 is a vertical cross-section, taken on line $x$ in Fig. 1, looking in in the direction of the arrow 2; and Fig. 3 is a like section, taken on line $x$ in said Fig. 1, but looking in the direction of the arrow 3. Fig. 4 is a top view of the governor, rheostat, and part of the car-wheel axle, illustrating one arrangement of operating the rheostat. Fig. 5 is a longitudinal vertical section of the armature half-sections and certain other sectional parts for securing the same to the car-wheel axle. Fig. 6 is a face view of a pair of the half-sections on which the armature-wire is wound. Fig. 7 is a vertical section, and Fig. 8 a face view, of the commutator made in half-sections. Fig. 9 is a diagrammatic view of the dynamo, pole-changer, mechanical governor, and rheostat and the system of wiring comprised in the electric-system for lighting and heating railway-cars.

Similar letters and numerals of reference are employed in each of the above-described views to indicate corresponding parts.

I will first describe the general arrangement and construction of the dynamo, the several parts of which are made in half-sections and then secured to the car-wheel axle $b$.

A is the dynamo which supplies the electrical energy for operating the lamps or other electrical translating devices in the main circuit in the car. Said dynamo comprises therein an armature $a$, consisting, essentially, of a series of semicircular rings $a'$, which are arranged upon each other with thin sheets of insulating material between them to form a pair of semicylindrical armature-sections, substantially as shown in Figs. 5 and 6. Said semicircular rings are each provided with the dovetailed portions $a^2$, in which, when two of said semicylindrical sections formed by a suitable number of such semicircular rings are placed in position on a car-wheel axle, correspondingly-formed keys $a^3$ and $a^4$ are driven to firmly bind and secure said previously-wound semicylindrical sections on the car-wheel axle $b$. Said semirings $a'$ are cut away, as at $a^5$ and $a^6$, in the usual manner, and they are secured together by means of suitably-insulated bolts $a^7$ to form said semicylindrical sections, as clearly shown. Said armature-sections are finished by using wire of the required size and length, which is wound around the adjacent half-rings $a'$ until said cut-away parts $a^5$ and $a^6$ are entirely filled, leaving two projecting ends of wire dangling from each semicylindrical armature-section. When the two armature-sections have been completed in this manner and are locked on the car-wheel axle by means of the keys $a^3$ and $a^4$ in the dovetailed portions $a^2$, then the four dangling ends of the wire on the armature-sections are properly connected to form a complete circuit through the several coils of wire. On either side of said hollow armature thus completed are suitable bearing-plates $a^8$ and $a^9$, each having an outwardly-extending bearing portion $a^{10}$, all of said parts being made in halves and securely held in position on the opposite sides of the armature by means of bolts $a^{11}$, as will be clearly understood from Fig. 1. Said half-bearing plates $a^8$ and $a^9$ are cut away or recessed, as at $a^{12}$, whereby they may be fitted over suitable lugs or projections $b'$ on the car-wheel axle $b$ to prevent slipping of the parts thereon.

In Figs. 7 and 8 I have illustrated a form of commutator which consists, essentially, of the two half-sections $c$ and $c'$, provided with the bearing portions $c^2$ and $c^3$, respectively, and being adapted to be firmly clamped to the car-wheel axle $b$ by means of the bolts $c^4$. Each half-section $c$ and $c'$ is provided with a semicircular groove $c^5$, (see Fig. 7,) in which are secured the small commutator-sections $c^6$, separated from each other by any suitable insulating material, each commutator-section being connected with the armature-coil by means of the insulated wires $c^7$, as clearly indicated in Fig. 1. As will be readily understood from an inspection of said Fig. 1, said armature-sections and commutator-sections are secured directly to the car-wheel axle $b$, which rotates in the half-bearings $d$ and $d'$ of the sectional casing E, covering the parts of the dynamo to protect them from dirt, dust, and stones. Said casing, which may be of any suitable shape, consists of two sections $e$ and $e'$, having the surrounding flanges $e^2$, which are made to fit closely upon each other and are secured together by bolts $e^3$, as shown in Figs. 2 and 3. At $e^4$ and $e^5$ said sections $e$ and $e'$ are respectively provided with flanges which are fitted over said half-bearings $d$ and $d'$ and are secured thereto by set-screws or bolts $d^2$ and $d^3$. As an extra precaution to prevent the displacement of the bearing-plates $d$ and $d'$, semicylindrical rings $d^4$ and $d^5$, having flanges and secured together by the bolts $d^6$, (see Fig. 1,) are permanently fixed on the axle $b$ by the bolts $d^7$ to form collars alongside of said bearing-plates $d$ and $d'$. To prevent the rotation of said casing on the axle $b$, the upper section $e$ is provided with suitable screw-eyes $e^6$ and chains $e^7$, connected therewith and secured to the beams of the car-truck, which permits of a partially-swinging motion of the casing and its bearings on the car-wheel axle, but prevents its turning with the latter. Said sections $e$ and $e'$ are open in the top and bottom, respectively, and secured in said openings by bolts $f^2$ in such a manner as to project into the casing are suitable soft-iron cores $f$ and $f'$, which are curved, as at $f^3$, and are wound with the wire coils $f^4$ and $f^5$ to form the field-magnets of the dynamo, as will be clearly evident from Figs. 1 and 2.

The brush-holders, which may be of any suitable construction, so far as the brush-holding part is concerned, consist of two half-sections or holders $g$ and $g'$, secured by means of bolts $g^2$ directly to the ends of the half-sleeves extending into the casing E, as will be understood more particularly from Fig. 5, the brushes $g^3$ of said holders extending from the side thereof and being in operative contact with the commutator-sections $c^6$ as they pass said brushes in sliding contact when the car-wheel axle is rotating. Thus it will be seen that a dynamo has been devised which can be secured to the car-wheel axle without necessitating the removal of the car-wheel from the axle to arrange the dynamo thereon.

Of course it will be evident that the parts of the dynamo and the casing E and field-magnets may be differently constructed, the essential feature of the invention being a dynamo, for the purposes herein stated, comprising therein field-magnets, an armature, commutator, and brush-holders, all made in half-sections, and means for securing said half-sections to the car-wheel axle.

I will now proceed to describe the manner of carrying out that part of my invention pertaining to the varying the strength of the field-magnets automatically and instantly in proportion to the increase or decrease of the armature speed.

In circuit with the field-coils of the dynamo is an ordinary rheostat $h$, secured in any suitable position to the side of the casing E and provided with a pivoted controlling lever or arm $h'$, which makes contact with the rheostat-plates $h^2$ and is in circuit with the circuit-wires 8 and 9, as clearly indicated in Fig. 9. Said lever is operatively connected, by means of an intermediately-arranged system of crank-arms $i$ or any other suitable mechanism, with one end of a mechanical ball-governor $i'$, arranged in a bracket $i^2$ and having a pinion $i^3$ in operative engagement or mesh with a gear-wheel $i^4$, secured directly to the axle $b$, as in Figs. 1 and 4, or the parts of said governor may be made to slide directly on the car-wheel axle $b$, as indicated in Fig. 9.

Any suitable construction of governor and connecting mechanism may be used to operate the controller $h'$ of the rheostat.

When the speed of the axle and the armature thereon, and hence the electromotive force of the dynamo, increases above a predetermined number of revolutions, then the governor causes the arm $h'$ of the rheostat to throw into circuit any desired resistance, and thereby decreases the electromotive force in the field-coils of the dynamo in proportion to the speed of the armature and its axle and the resistance cut in, and the result will be that the output of the electromotive force from the dynamo into the main circuit is equalized and maintained constant. As the speed is decreased the lever $h'$ returns to its normal position and the resistance-coils in the rheostat are again cut out of circuit, as will be clearly understood. Thus it will be seen that in its normal condition when the dynamo is rotating at a predetermined speed there will be no interruption of the current in its passage from the brushes of the dynamo to the fields, the current passing through the circuits and the rheostat without obstruction; but as soon as the first resistance-coil is introduced, as the speed of the armature increases above the predetermined speed, then there is a corresponding decrease of the electromotive force in the field-coils of the dynamo, and the result is a decrease in the magnetic induction of the fields which tends and does equalize the electromotive force of the dynamo.

The general arrangement of the main circuit and the working circuits and the several operating devices is illustrated in Fig. 9.

It will be understood that the armature-shaft, which is the car-wheel axle, is necessarily subject to reversal of rotation, according to the direction in which the car is moving, and of course when the dynamo-armature rotates in opposite directions there is a change of polarity of the dynamo at its terminals. I have therefore arranged in the casing-section $e$ a pole-changer which consists of a pivoted yoke $l$, having a post $l'$, extending into a pivoted socket $k$, and is pressed down upon a leather or other band $m$, secured in any well-known manner on the car-wheel axle $b$ by means of a coiled spring $l^2$ in said socket. Pivotally connected with the one side of said socket $k$ is a bar $n$, which operates the pivoted contact-arms $o$ and $o'$ of the switch O, (see Figs. 3 and 9,) said arms being connected by a cross-bar $o^2$, to which the bar $n$ is pivotally attached. When the axle $b$ rotates in the direction of the arrow $y'$, a small wheel $l^3$ on said yoke is brought directly over the band $m$, where it remains in operative rotating engagement until the car-wheel axle reverses its direction of rotation and a small wheel $l^4$ on the other end of the yoke is brought in engagement with the leather strap on the axle. Stout springs $l^5$ and $l^6$ act as stops to limit the pivotal movement of said yoke $l$ and return said parts to their normally inoperative positions when the car-wheel axle is rotating below the predetermined speed or is at a standstill.

Suppose the contact-arms $o$ and $o'$ have made contact at 1 and 3 of the switch. When the axle $b$ is rotating in the direction of arrow $y'$ in Fig. 3, then the current generated passes from the brush at 5 (see Fig. 9) through the wire 6 and the contact-arm $o$ to plate 1, thence by wire 7 through the two field-coils of the dynamo, wire 8 to the rheostat, wire 9 to plate 3, and by contact-arm $o'$, and, finally, by wire 10 to the dynamo-brush at 11, thereby establishing a complete circuit, and the result will be that the circuit passes through the main circuit 12 13 and the lamps 14 and other translating devices therein in the direction of the arrows, as shown. Now suppose the rotation of the car-wheel axle and the armature of the dynamo is reversed, causing a change of polarity at the terminals 5 and 11. At the same time the mechanical pole-changer has been operated and the contact-arms $o$ and $o'$ have been automatically shifted to make electrical contact with the plates 2 and 4, respectively. The current generated will now pass from the terminal 11 of the dynamo through wire 10, contact-arm $o'$ to plate 4, wire 15 to plate 1, and wire 7 through the field-coils, then through wire 8 to the rheostat, wire 9 to plate 3, wire 16 to plate 2, contact-arm $o$ to wire 6, and terminating the completed circuit at the terminal 5 of the dynamo, while the current passes into and through the main circuit without any change of direction. In this manner the polarity of the dynamo is changed according to the direction of rotation of the car-wheel axle and armature of the dynamo without altering the direction of the current through the fields, thereby avoiding the danger of demagnetizing the magnets.

It will be evident that many changes may be made in the arrangements and combinations of the parts herein shown, and I therefore do not wish to be understood as limiting my invention to the exact arrangements and combinations of the parts as shown and described.

Having thus described my invention, what I claim is—

1. In a means for generating electricity from a car-wheel axle, the combination, with a car-wheel axle, of a dynamo on said axle, a governor arranged on the axle, an electric regulating device controlled by said governor, adapted to equalize the output of electricity of the dynamo and maintain the same constant, and a pole-changer comprising therein, a pivotally-arranged contact-arm and means for actuating said arm from the car-wheel axle, and contacts in circuit with said dynamo, substantially as and for the purposes set forth.

2. In a means for generating electricity from a car-wheel axle, the combination, with a car-wheel axle, of a dynamo on said axle, a governor on said axle, an electric regulating device controlled by said governor, adapted to equalize the output of electricity of the dynamo and maintain the current constant, and a pole-changer actuated from said car-wheel axle, comprising therein, a pair of contact-arms and a cam operated by said axle, a bar or arm connected with said cam and adapted to actuate said contact-arms, and electrical contacts in circuit with said dynamo, all arranged, substantially as and for the purposes set forth.

3. In a means for generating electricity from a car-wheel axle, the combination, with a car-wheel axle, of a dynamo on said axle, a governor on said axle, an electric regulating device controlled by said governor, comprising therein, an electric current-regulator or arm $h'$ controlled by said governor, a rheostat adapted to decrease the electromotive force in the field-coil of the dynamo, and thereby equalize the voltage of the dynamo into the main circuit, and a pole-changer, comprising therein, a pivotally-arranged contact-arm, and means for actuating said arm from the rotating car-wheel axle, and electrical contacts in circuit with said dynamo, substantially as and for the purposes set forth.

4. In a means for generating electricity from a car-wheel axle, the combination, with a car-wheel axle, of a dynamo on said axle, a governor on said axle, an electric regulating device controlled by said governor, comprising therein, an electric current-regulator or arm $h'$ controlled by said governor, a rheostat adapted to decrease the electromotive force in the field-coil of the dynamo and thereby equalize the voltage of the dynamo into the main circuit, and a pole-changer actuated from the car-wheel axle, consisting essentially, of a cam, operated by said axle and a pair of contact-arms controlled by the action of said cam, and electrical contacts in circuit with said dynamo, all, substantially as and for the purposes set forth.

5. In a means for generating electricity from a car-wheel axle, in combination, with a car-wheel axle, a dynamo, comprising therein, field-magnets, an armature, commutator, and brush-holders, all made in half-sections, and means for securing said half-sections to the car-wheel axle and together to form a complete dynamo, substantially as and for the purposes set forth.

6. In a means for generating electricity from a car-wheel axle, in combination, with a car-wheel axle, a dynamo, comprising therein, field-magnets, an armature, commutator and brush-holder, all made in half-sections, and means for securing said half-sections to the car-wheel axle and together to form a complete dynamo, a governor arranged on said axle, and an electric regulating device controlled by said governor, adapted to equalize the output of electricity of the dynamo and maintain the same constant, substantially as and for the purposes set forth.

7. In a means for generating electricity from a car-wheel axle, in combination, with a car-wheel axle, a dynamo, comprising therein, field-magnets, an armature, commutator and brush-holder, all made in half-sections, means for securing said half-sections to the car-wheel axle and together to form a complete dynamo, a governor on said axle, an electric regulating device controlled by said governor, and a pole-changer actuated from the car-wheel axle, substantially as and for the purposes set forth.

8. In a means for generating electricity from a car-wheel axle, in combination, with a car-wheel axle, a dynamo, comprising therein, an armature, commutator and brush-holder, all made in half-sections, means for securing said half-sections to the car-wheel axle and together, a shell or casing, also of half-sections, on said axle, and a core in each half-section of said casing, forming the magnetic fields of the dynamo, substantially as and for the purposes set forth.

9. In a means for generating electricity from a car-wheel axle, in combination, with a car-wheel axle, a dynamo, comprising therein, an armature, commutator and brush-holder, all made in half-sections, means for securing said half-sections to the car-wheel axle and together, a shell or casing, also of half-sections, on said axle, and a core in each half-section of said casing, forming the magnetic fields of the dynamo, and a pole-changer on said casing, actuated from the car-wheel axle, substantially as and for the purposes set forth.

10. In a means for generating electricity from a car-wheel axle, in combination, with a car-wheel axle, a dynamo, comprising therein, an armature, commutator and brush-holder, all made in half-sections, means for securing said half-sections to the car-wheel axle and together, a shell or casing, also made in half-sections, on said axle, and a core in each half-section of said casing, forming the magnetic fields of the dynamo, a governor arranged directly on the car-wheel axle, and an electric regulating device on said casing, controlled by said governor, adapted to equalize the output of electricity of the dynamo and maintain the same constant, substantially as and for the purposes set forth.

11. In a means for generating electricity from a car-wheel axle, in combination, with a car-wheel axle, a dynamo, comprising therein, an armature, commutator and brush-holder, all made in half-sections, means for securing said half-sections to the car-wheel axle and together, a shell or casing, also made in half-sections, on said axle, and a core in each half-section of said casing, forming the magnetic fields of the dynamo, a governor on said axle, and an electric regulating device on said casing controlled by said governor, comprising therein, an electric-current regulator or arm $h'$, and a rheostat adapted to decrease the electromotive force in the field-coil of the dynamo, and thereby equalize the voltage of the dynamo into the main circuit, substantially as and for the purposes set forth.

12. In a means for generating electricity from a car-wheel axle, in combination, a dynamo on the car-wheel axle, comprising therein, an armature-coil, magnetic cores $f$ and $f'$ and coils $f^4$ and $f^5$ thereon, a governor on the car-wheel axle, a current-controller $h'$ controlled by said governor, a rheostat, circuit-wires connecting said controller with the rheostat, circuit-wires connecting the field-coils with the rheostat, and circuit-wires connecting said field-coils with the main circuit-wires, all arranged, substantially as and for the purposes set forth.

13. In a means for generating electricity from a car-wheel axle, in combination, a dynamo on the car-wheel axle, comprising therein, an armature-coil, magnetic cores $f$ and $f'$ and coils $f^4$ and $f^5$ thereon, a governor on the car-wheel axle, a current-controller $h'$ controlled by said governor, a rheostat, circuit-wires connecting the field-coils with the rheostat, circuit-wires connecting both field-coils with the main circuit-wires, a pole-changer, comprising therein electrical contacts in circuit with the dynamo-circuit, and circuit-wires 15 and 16 connecting said contacts, all arranged on a car-truck, substantially as and for the purposes set forth.

14. In a means for generating electricity from a car-wheel axle, in combination, with a car-wheel axle, half-sections $a^{10}$, adapted to be secured on said axle to form a sleeve, and a dynamo, comprising therein, field-magnets, and two armature-sections separately wound and connected to form a complete armature-coil, and a commutator and brush-holder, all made in half-sections, all to form a complete dynamo, substantially as and for the purposes set forth.

15. In a means for generating electricity from a car-wheel axle, in combination, with a car-wheel axle, half-sections $a^{10}$, adapted to be secured on said axle to form a sleeve, and a dynamo, comprising therein, two armature-sections separately wound and connected to form a complete armature-coil, and a commutator and brush-holders, all made in half-sections, as set forth, a casing E on said car-wheel axle, also made in half-sections, and cores $f$ and $f'$ in each half-section of said casing wound to form the field-coils of said dynamo, substantially as and for the purposes set forth.

16. In a means for generating electricity from a car-wheel axle, the herein-described dynamo adapted to be secured to a car-wheel axle, comprising therein, two half-sections forming a casing, adapted to be secured to the car-wheel axle, cores $f$ and $f'$ forming stationary magnets, and an armature on said axle rotating between said magnets, consisting essentially, of half-sections, secured together and wound to form semicylindrical armature-coils, and means for securing said sections together and to the car-wheel axle, substantially as and for the purposes set forth.

17. In a means for generating electricity from a car-wheel axle, the herein-described dynamo, adapted to be secured to a car-wheel axle, comprising therein, half-bearings $a^{10}$, each half-bearing having a flange at one end, half-sections $e$ and $e'$ forming a casing adapted to be secured to said axle, cores $f$ and $f'$ in said half-sections forming stationary magnets, an armature on said axle, rotating between said magnets, consisting essentially, of half-rings $a'$ secured together and wound to form semicylindrical armature-coils, means for securing said sections together, and to said half-bearings, commutator-sections made in halves and secured to the car-wheel axle, and brush-holders on said car-wheel axle, all arranged, substantially as and for the purposes set forth.

In testimony that I claim the invention set forth above I have hereunto set my hand this 5th day of July, 1895.

MORRIS MOSKOWITZ.

Witnesses:
R. G. TOMPSON,
FREDK. C. FRAENTZEL.